Figure 1:
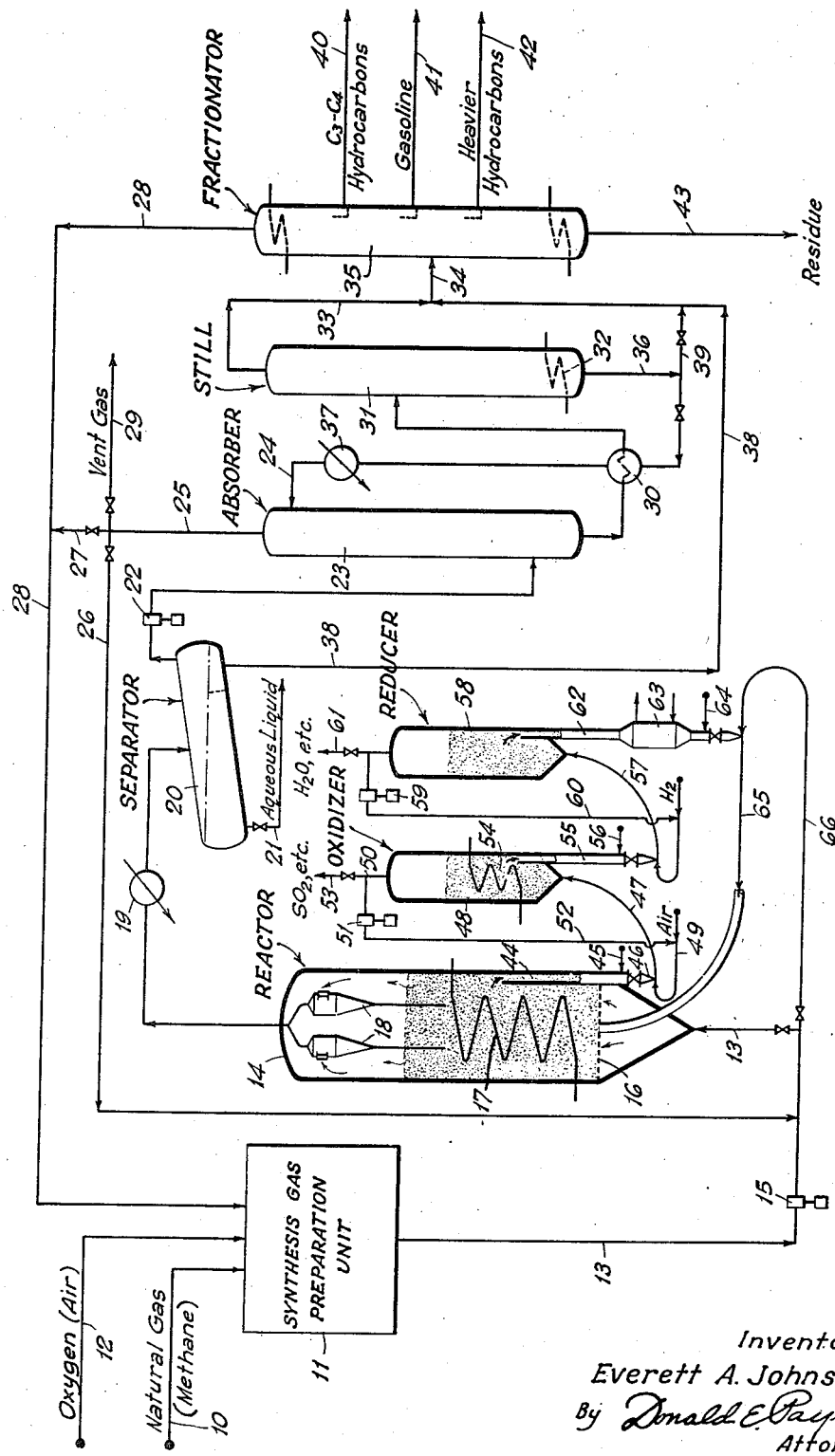

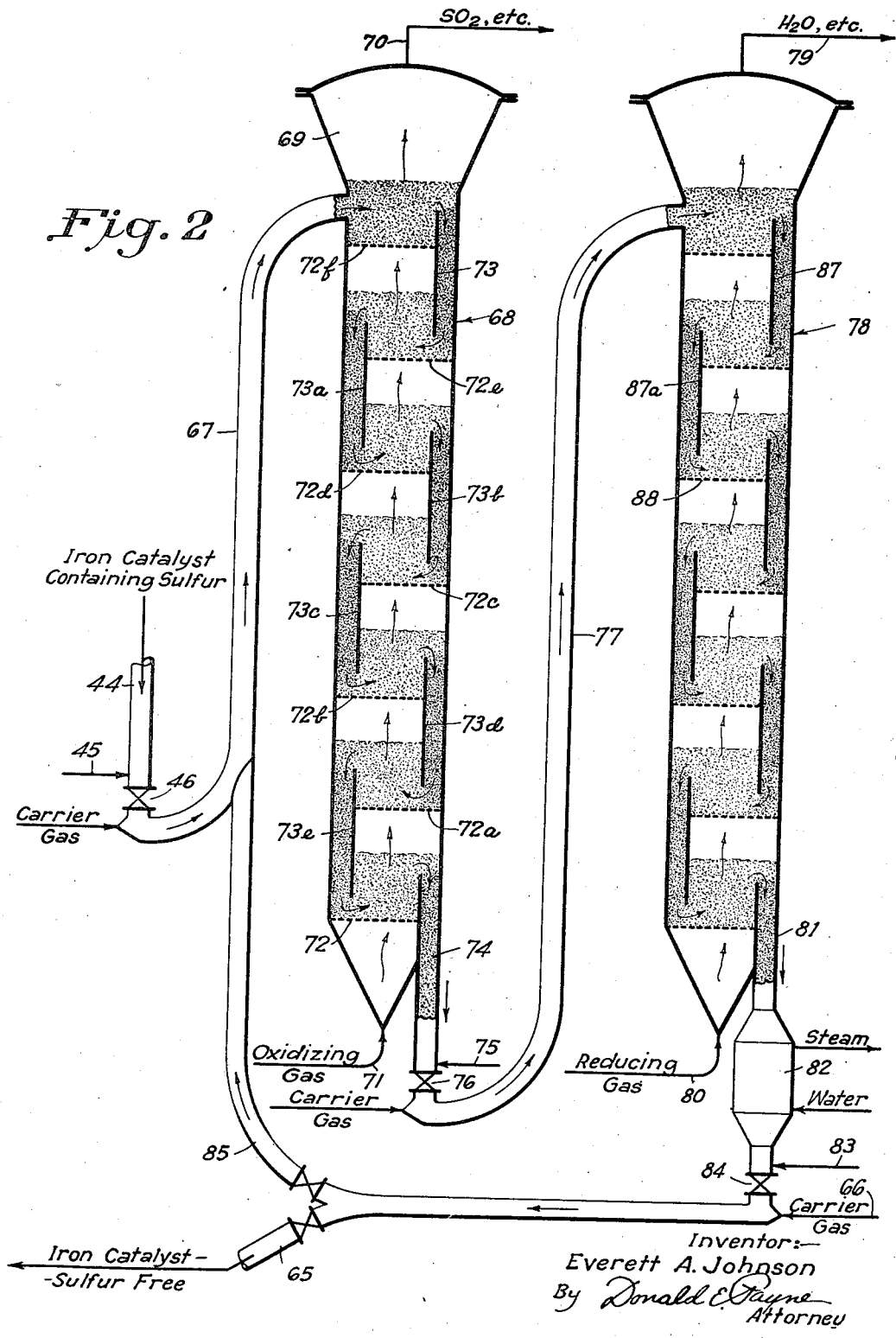

Patented Dec. 7, 1948

2,455,419

UNITED STATES PATENT OFFICE 2,455,419

SYNTHESIS OF HYDROCARBONS AND REGENERATION OF SYNTHESIS CATALYST

Everett A. Johnson, Park Ridge, Ill., assignor to Standard Oil Company, Chicago, Ill., a corporation of Indiana Application October 11, 1944, Serial No. 558,117

15 Claims. (Cl. 260—449.6)

This invention relates to maintaining the activity of finely divided or supported metal catalysts which are employed in hydrocarbon synthesis from hydrogen and carbon monoxide and/or in desulfurizing gas streams. More particularly the invention relates to a fluidized solids system wherein contact of metal catalysts with gasiform fluids is effected and the catalysts subsequently are subjected to oxidation followed by reduction before contacting the metal catalysts with additional quantities of gasiform fluids. As far as catalyst handling is concerned, this application is a continuation-in-part of my copending applications Serial Nos. 392,846-7 filed May 10, 1941.

In the Synthol process of producing hydrocarbons from carbon monoxide and hydrogen it has heretofore been required that the sulfur content of the synthesis feed gas be reduced below about .5 grain and preferably below about .2 grain per 100 cubic feet of gas. To effect this degree of desulfurization it has been necessary to employ expensive equipment in a preliminary desulfurizing operation. It is an object of this invention to avoid such independent desulfurizing operation and to effect desulfurization with the synthesis catalyst itself. Another object of my invention is to provide a system wherein feed gases of relatively high sulfur content can be economically employed in the catalytic reduction of carbon oxides in the production of hydrocarbons.

A further object of this invention is to maintain an iron catalyst in a high state of activity so that it may serve its intended function more effectively and for a longer period of time than previously possible.

Still another object is to avoid undue accumulation of sulfur or sulfur compounds in iron catalysts and to provide improved method and means for removing sulfur compounds and for restoring the catalyst to a high state of activity. A specific object of my invention is to provide method and means for removing sulfur compounds from gasiform fluids including CO—$H_2$ mixtures and hydrocarbon vapors.

The invention finds particular utility in providing an economical method and means for the conversion of sulfur-containing gases by the catalytic reduction of carbon oxides. Therefore, it is another object of this invention to provide an improved method and means for intermittently or continuously removing sulfur from the synthesis catalysts, restoring the activity of the catalysts and reemploying the reactivated catalysts in a synthesis step. Other objects will become apparent to those skilled in the art as the detailed description of my invention proceeds.

In practicing my invention I employ a finely divided iron catalyst which may be "fluidized" or maintained in dense turbulent phase suspension in upflowing gases or vapors. Such catalyst is employed in a reaction zone which, for example, may be a hydrocarbon synthesis conversion zone or a desulfurizing zone. Before the catalytic effectiveness of the catalyst is unduly reduced by sulfur accumulations the catalyst is intermittently or continuously contacted with oxygen or an oxidizing gas while suspended in said oxidizing gas as a dense turbulent phase at a temperature within the approximate range of about 1000 to 2000° F. Under such conditions the catalyst is oxidized, the sulfur is removed as sulfur dioxide and any carbonaceous deposits are removed as oxides of carbon. The oxidized catalyst is then reduced with hydrogen or other suitable reducing gas, also at high temperature so that the iron oxide is converted once more to a lower state of oxidation and in most cases substantially completely to metallic iron. For obtaining maximum catalyst activity I may alternately oxidize and reduce the catalyst a number of times before again suspending it in the reaction gas stream or I may continuously recycle a substantial part of the reduced catalyst back to the oxidizing zone while returning the remainder of the reduced catalyst to the reaction zone. Likewise the catalyst en route to the oxidation step can be employed to desulfurize the feed gases to the hydrocarbon conversion.

Since the temperature of a Synthol reaction zone is usually in the general vicinity of about 400 to 650° F. and the temperature in the oxidation and reduction zones is above 700° F., preferably within the approximate range of 1000 to 2000° F., the problem presented is of utilizing heat most effectively. Heat exchangers may be employed in each of the dense phase turbulent catalyst suspensions or the temperatures of each dense phase may be controlled by recycling catalyst therefrom to a heat exchanger and back to said dense phase but in the oxidation and reduction steps considerable advantage is obtained by employing a multi-stage - countercurrent system wherein the catalyst flows downwardly from dense phase to dense phase countercurrent to upflowing gases. Thus the catalyst itself may enter the top of the oxidizing zone at a temperature of only about 400° F. or even less and as it proceeds from stage to stage in the oxidizer it becomes heated by the exothermic heating reaction so that it will leave the base of the oxidizing zone at a temperature of about 1400 to 1600° F. This hot catalyst similarly passes in stages downwardly through a countercurrent reduction zone countercurrent to a cold reducing gas introduced at its base so that a minimum amount of cooling is required before the reduced catalyst is reintroduced into the conversion zone. Any net production of heat in the oxidation zone may be removed by heat exchangers in the various dense phases or by the use of sufficient inert gas along with the oxygen to carry away the excess heat.

Another feature of the countercurrent oxidation and reduction systems is the more efficient utilization of the oxidizing and reducing gases respectively. Since gases must be passed upwardly through dense phase catalyst at a rather critical velocity in order to maintain the desired dense phase conditions, the gas cannot be completely utilized in a single passage through the dense phase. Where single stage oxidation or reduction is employed, a substantial portion of the gases leaving the top of the respective zone may be recycled to the base of said zone by a suitable circulating fan designed to withstand the high temperatures and erosive effects of any entrained catalyst particles. However, by employing the multi-stage-countercurrent system a sufficient number of stages may be employed to effectively utilize most of the oxidizing and reducing gases respectively thereby eliminating the necessity of gas recycling.

The invention will be more clearly understood from the following detailed description of specific examples thereof read in conjunction with the accompanying drawings which form a part of the specification and in which Figure 1 is a schematic flow diagram of a hydrocarbon synthesis system employing my invention for catalyst reactivation;

Figure 2 is a schematic flow diagram of a countercurrent system for effecting oxidation and reduction.

My iron catalyst may be prepared by igniting iron nitrate with optionally added promoters and in the presence or absence of a carrier. An iron nitrate solution which may contain up to about 25% copper (based on the iron) may be precipitated onto acid treated clay such as Super Filtrol, kieselguhr or other carrier by alkali carbonates, then dried and impregnated with about .5 to about 3% of potassium carbonate. After ignition the catalyst thus prepared may be introduced directly into a carbon monoxide synthesis reactor and reduced with hydrogen to metallic iron. Unless the catalyst is substantially completely reduced the Synthol reaction may produce methane to the exclusion of desired products.

The iron catalyst may be of the type employed for ammonia synthesis. Pure iron may be burned in a stream of oxygen, the oxide ($Fe_3O_4$) fused, and the fused mass broken or ground up and used as such. Promoters may be added to the fused mass such, for example, as 2.5% silicon, 2.5% titania, 5% potassium permanganate, etc. (all percentage by weight based on iron).

As another example, catalyst may be prepared by decomposing iron carbonyl to form iron powder, adding 1% sodium carbonate or about 5% of alumina to serve as a promoter, then pelleting the powder with the added promoter, sintering the pellets for about four hours at about 1550 to 1650° F. and finally reducing the sintered pellets at about 1550° F. with a reducing gas such as hydrogen. Catalyst particles prepared by grinding up such pellets may have a bulk density of about 120 to 150 pounds per cubic foot.

The catalyst referred to in the following examples is one in which the iron is deposited on a finely divided carrier such as acid treated clay (Super Filtrol), Celite, kieselguhr, or the like. The iron may be deposited on the carrier as iron nitrate, subsequently ignited and reduced, or it may be deposited in the carrier by iron carbonyl decomposition therein. The activity of the finely divided iron entrapped in or carried by the carrier may be modified by the addition of alkali metal compounds and/or compounds such as the oxides, hydroxides, carbonates, or halides of cerium, chromium, copper, manganese, molybdenum, thorium, titanium, zirconium, and the like. Such compound or compounds may be added to the reduced iron catalyst in the aqueous or dry state either before or after reduction. Likewise, vaporizable carbonyl of cobalt, iron, nickel or ruthenium may be decomposed so that the corresponding metal may be deposited in or on the carrier or iron catalyst, preferably in the presence of a reducing gas.

The iron catalyst prepared by the above methods or by any conventional method should be of small particle size, i. e. should have a particle size chiefly within the approximate range of 10 to 200 microns or preferably about 20 to 100 microns. When the catalyst is in such a fine state of subdivision it may be "fluidized" by an upflowing gas stream and the vertical gas velocity for such fluidization should be such as to decrease the bulk density or increase the bulk volume so that the catalyst particles will be separated from each other by a film of gas and thus suspended in a dense but highly turbulent liquid-like phase which is superimposed by a dilute or dispersed catalyst phase of very low density. The density of the fluidized turbulent dense catalyst phase may be about 30 to 90%, usually in the general vicinity of 50 to 60% of the density of settled catalyst material. Such density is obtained by employing the proper vertical gas velocities; with iron catalyst supported on finely divided Super Filtrol such velocities may be within the approximate range of .4 to 4, e. g. about 1 to 2 feet per second. With the heavier iron catalyst particles higher velocities may be necessary.

In Figure 1 my invention will be described as it is utilized in a hydrocarbon synthesis process. A hydrocarbon gas, such as natural gas (which may be chiefly methane) is introduced through line 10 to synthesis gas preparation unit 11 and partially burned with oxygen or air from line 12 under conditions to produce a gas mixture consisting essentially of carbon monoxide and hydrogen. The synthesis gas preparation may be effected at a temperature in the approximate range of 1800 to 2200° F. in the absence of catalyst or at lowered temperatures in the presence of catalyst. Carbon dioxide and/or steam may likewise be utilized in the synthesis gas preparation unit and the various gases may be employed in such proportion as to yield any desired ratio of hydrogen to carbon monoxide. While a 1:1 carbon monoxide-hydrogen ratio can be used I prefer to prepare a synthesis gas with about a 1:2 carbon monoxide-hydrogen ratio. Any unreacted gases from the synthesis step may be recycled either directly to the synthesis reactor or the synthesis gas preparation unit. Since no invention is claimed in the synthesis gas preparation step per se this step requires no detailed description (note U. S. Letters Patent 2,234,941; 2,230,467; 2,185,989, etc.).

The synthesis gas mixture contains at least 1 mol and preferably about 2 mols of hydrogen per mol of carbon monoxide along with unavoidable diluents such as nitrogen and carbon dioxide. These diluents are relatively inert and are unobjectionable when present only in small amounts but if they are allowed to accumulate in any appreciable quantity the effective capacity of the reactor will be greatly reduced. The partial combustion of methane with oxygen yields a synthesis gas containing approximately 2 mols of hydrogen per mol of carbon monoxide which gas mixture is passed by line 13 to synthesis reactor 14 at a temperature of approximately 400° F., a compressor 15 being employed when preparation unit 11 is operated at a lower pressure than reactor 14. The actual hydrogen : carbon monoxide ratio in total gases entering the reactor may be considerably higher than 2:1 because of high hydrogen concentration in recycled gas as will be hereinafter pointed out.

Reactor 14 may operate under a pressure within the approximate range of 50 to 500 pounds or more per square inch, e. g. about 75 pounds per square inch and at a temperature within the approximate range of 450 to 650° F., e. g. about 550° F. A commercial plant for producing approximately 4000 barrels per day of hydrocarbon synthesis product liquid (including butanes) may, when operating at 4 or 5 atmospheres' pressure, require a reactor at least about 30 feet in diameter and 60 feet high and the retention in the reactor of 2 to 3 million pounds or more of catalyst material (including catalyst support). Reactors of smaller diameter but increased height will be required at higher pressures. With the supported iron catalyst the reactor may be designed for an upflow gas velocity of approximately 1½ feet per second. From these general principles the reactor sizes, shapes, etc. may be determined for other catalysts and operating conditions.

The synthesis gas charge rate may be in the general vicinity of 6,000,000 feet per hour (all gas volumes being at 60° F. and atmospheric pressure). In this specific example the synthesis gas is introduced at a pressure of about 5 atmospheres through a distributing plate or grid 16 above which is the dense suspended fluidized mass of catalyst consisting of about 10% by weight of finely divided iron carried by acid treated clay such as Super Filtrol having a particle size ranging from about 1 to 100 microns, chiefly about 10 to 80 microns. Temperature control may be effected by suitable heat exchangers mounted within the reactor itself and in which case the diameter of the reactor will be increased to compensate for the cross-sectional area of the vertical heat exchange elements. Alternatively temperature control may be effected by withdrawing fluidized solids therefrom, passing said solids through a cooler and returning them to the reactor. Temperature may be effected by injecting a vaporizable liquid, such as water or a hydrocarbon fraction directly into the fluidized catalyst mass. In the drawing any such temperature control means is diagrammatically illustrated by cooling coil 17.

To prevent entrained catalyst particles from being carried out of the top of the reactor with the effluent gas stream I may employ cyclone separation means 18 as taught, for example, in U. S. Letters Patent 2,337,684, the cyclone dip legs in this case extending directly into the dense phase in the reactor. Alternatively I may employ ceramic filters or any other known means of separating finely divided solids from gases. The space velocity in the reactor may be in the general vicinity of 50 to 500 or more volumes of gas per hour per volume of space occupied by the dense catalyst phase in the reactor, e. g. about 150 cubic feet per hour per cubic foot of dense catalyst phase.

The effluent stream may be passed through condenser 19 which may be of the tube bundle type or counter-current liquid scrubbing type for effecting the condensation of water formed in the synthesis step. The cooled products are introduced into separator 20 from which an aqueous liquid, i. e. the water together with water soluble products is withdrawn through line 21. Gases are introduced by compressor 22 to the base of absorber 23 and scrubbed with absorber oil introduced through line 24 for recovering condensible hydrocarbons. The unabsorbed gases leaving the top of the absorber through line 25 may be recycled through line 26 to reactor 14, introduced by lines 27 and 28 back to synthesis gas preparation unit 11 or vented through line 29. At least a part of the gases must be vented to prevent nitrogen build-up in the system and it should be understood that suitable means may be employed for separating nitrogen from gases to be recycled in the system. The recycled gases may have a higher hydrogen : carbon monoxide ratio than the prepared synthesis gas mixture so that in the reactor itself such ratio may be appreciably higher than 2:1.

The rich absorber oil passes through heat exchanger 30 to still 31 provided with heater 32, the overhead from the still passing by lines 33 and 34 to fractionator 35 and the bottoms from the still being returned by line 36 through heat exchanger 30, cooler 37 and line 24 back to the top of the absorber.

Liquid hydrocarbons from separator 20 pass by lines 38 and 34 to fractionator 35 and a portion of the liquid from line 36 may be introduced into the fractionator through lines 39, 38 and 34.

The fractionation system is diagrammatically illustrated as a single column from which fixed gases are returned to the synthesis gas preparation unit by line 28, a normally gaseous hydrocarbon stream is withdrawn through line 40, gasoline stream through line 41, heavier hydrocarbon stream through line 42 and residual stream through line 43. It should be understood that any known type of fractionation and product recovery means may be employed and such means are contemplated by the schematic representation hereinabove set forth.

The catalyst in reactor 14 gradually loses its effectiveness particularly when the charging stock contains appreciable amounts of sulfur. In order to maintain the catalyst at substantially constant activity I continuously or intermittently withdraw catalyst solids directly from the dense phase in the reactor by means of standpipe 44 which preferably extends upwardly into the dense phase and may be integrally associated with the reactor wall. Catalyst in this standpipe is maintained in fluidized condition by the introduction of an aeration gas through line 45 which gas may be a portion of the synthesis gas, recycled gas or the like. Catalyst is dispersed from the base of standpipe 44 in amounts regulated by valve 46 into conduit 47 through which it is introduced into oxidizing chamber 48 by oxygen, air, steam or other oxidizing gas introduced from source 49. Oxidizer 48 may be relatively small in size as compared with the reactor and may, for example, be a cylindrical vessel about 1 to 5 feet in diameter by about 5 to 15 feet in height. The upward gas velocity in chamber 48 should be controlled to maintain the catalyst therein as a dense turbulent suspended phase, i. e. in this particular case should be of the order of about 1 to 2 feet per second. Since the oxygen cannot be completely utilized in a single pass through the oxidizing chamber at least a part of the gas leaving the top of the oxidizer through line 50 may be recycled by blower 51 and line 52. At least a part of the gas including liberated sulfur dioxide, carbon oxides, etc. are vented from the system through line 53. The oxidizer should be operated at a temperature within the approximate range of 750 to about 2000° F. preferably about 1000 to 1300 or for example about 1200° F. and at a pressure which is substantially the same as that employed in reactor 14. Considerable heat is evolved in the oxidation of the catalyst and such heat may be removed by heat exchanger diagrammatically illustrated by cooling coil 54. From a practical standpoint ordinary heat exchangers are not suitable for such high temperatures and it may be more desirable to obtain the temperature control by withdrawing dense phase catalyst through a refractory conduit, cooling the withdrawn catalyst by direct or indirect contact with water or other cooling fluid and returning the cooled catalyst to the oxidizing zone. The oxidation is preferably continued until substantially all of the sulfur has been removed as sulfur dioxide and the iron in the catalyst composition has been converted into ferric oxide.

The oxidized catalyst may be withdrawn from the dense catalyst phase and oxidizer 48 through standpipe 55 at the base of which aeration gas is introduced through line 46 to maintain the catalyst in fluidized condition. The oxidized catalyst may then be transferred through conduit 57 to reducing chamber 58 by hydrogen or a hydrogen-rich gas introduced from source 59. Here again the upward gas velocities are maintained at such rate as to keep the catalyst in dense phase turbulent suspended condition and to effect maximum utilization of the reducing gas a substantial portion of it may be recycled by blower 59 and line 60 while the remainder, consisting essentially of steam, hydrogen, etc. is vented through line 61. The reducing step will be effected at substantially the same temperature and pressure as the oxidizing step and if necessary or desirable the temperature in the reducing chamber may be controlled by the use of a heat exchanger or catalyst recycle or by recycling catalyst through an external heater.

When the catalyst has been reduced to the desired lower state of oxidation, preferably with the iron reduced to metallic form, it is downwardly withdrawn through standpipe 62 which is provided with a cooler 63 for cooling the reduced catalyst back to a temperature of the order of 400 to 500° F. Here again the catalyst in the standpipe is maintained in aerated form by the introduction of aeration gas through line 64. Catalyst is returned from the base of standpipe 64 to reactor 14 through conduit 65 by means of synthesis gas from line 66. Standpipes 55 and 62, like standpipe 44, are provided with suitable valves at their base for controlling catalyst flow. I prefer to return catalyst to the reactor above distributor plate 16 although such catalyst may be introduced below the distributor plate if the openings therein are sufficiently large to permit distribution of catalyst as well as gases. Distributor plates may likewise be employed in the base of oxidizer 48 and reducer 58.

In some cases it may be desirable to return at least a portion of the reduced catalyst back to the oxidizer and to alternatively oxidize and reduce the catalyst a number of times before its return to the reactor; this may be effected by employing a separate standpipe and transfer line or by effecting transfer from the base of standpipe 62 directly back to the base of oxidizer 48 through a conduit (not shown on Figure 1) by means of oxygen-containing gas.

In the system hereinabove described in connection with Figure 1 it will be seen that the catalyst is not only continuously or intermittently freed from sulfur but that it is likewise freed from any other catalyst poisons which are removable therefrom by oxidation and reduction at high temperatures. Furthermore, the activity of the catalyst itself is enhanced by the repeated oxidation and reduction steps. The continuous or intermittent regeneration of a portion of the catalyst permits the main reactor to remain on stream for an indefinite period of time with a catalyst of high activity. Since the catalyst reactivation effectively removes sulfur from the system it becomes unnecessary to employ expensive desulfurization treatments of the hydrocarbons introduced into the synthesis gas preparation unit or the synthesis gas charged to the reactor.

In Figure 2 I have illustrated an oxidation-reduction system which can be effectively utilized in the place of oxidizer 48 and reducer 58 of Figure 1. Here the deactivated, contaminated or sulfur-containing iron catalyst discharged from the base of standpipe 44 through valve 46 is picked up by any suitable carrier gas, such as air or gas vented from line 29 and carried thereby through line 67 to the upper zone of countercurrent oxidizer 68. The enlarged upper part 69 of this oxidizer enables the disengagement of the carrier gas from catalyst particles and the carrier gas together with spent oxidizing gas, sulfur dioxide, etc. are removed through the top of the oxidizer through line 70. Cyclone separators or filters are employed where necessary or desirable.

The oxygen, air or oxygen-containing gas is in this case introduced through line 71 at the base of the oxidizer and it passes upwardly through distributor plates 72, 72a, 72b, 72c, etc. at such a velocity as to maintain dense suspended catalyst phases above each of these distributor plates. The catalyst flows from the dense phase above the top distributor plate to the dense phase below the top of the distributor plate via downcomer 73 and thereafter it passes downwardly from zone to zone through downcomer 73a, 73b, 73c, etc. the downcomer being above an imperforate portion of the distributor plate so that the downflowing dense phase catalyst is out of contact with the bulk of the upflowing oxidizing gas. The downcomers extend a substantial distance above the respective plates to insure the maintenance of dense phases of substantial depths. The downcomer 73 and perforate plates 72 can be replaced by trays of bubble caps. Likewise an intermediate plate 72 or 88 can be imperforate with gasiform fluid outlet below the plate and inlet above the plate.

The countercurrent system is patricularly advantageous in my process because it enables the preheating of incoming catalyst from a temperature of about 550° F. to oxidation temperatures of about 1000° to 2000°, preferably about 1500° F. in the upper stages, the maximum oxidation temperature being reached one or two stages above the bottom of the tower. At the base of the tower the temperature is somewhat reduced by the relatively cold oxygen-containing gas stream but the catalyst is still sufficiently hot so that it may be introduced to the top of the reducing tower at a temperature of about 1200 to 1300° F. Furthermore, the oxygen is utilized so efficiently in the counter current system that recycling of the oxygen-containing gas is usually unnecessary.

Catalyst from the lowest stage in oxidizer 68 is withdrawn by standpipe 74 while maintained in fluent form by aeration gas introduced through line 75. The catalyst is discharged through valve 76 and carried by a carrier gas (e. g. from vent gas line 29) through line 77 to the top of reducer 78 which is similar in construction and operation to oxidizer 68 and hence will require no detailed description. The carrier gas together with steam, residual hydrogen, etc. is vented through line 79. Hydrogen or hydrogen-rich gas is introduced through line 80. The reduction is effected in countercurrent stages so that the hydrogen is effectively utilized and although the catalyst is somewhat cooled as it passes downwardly from stage to stage through column 78 it will still be at temperature upwards of 1000° as it leaves the base of this column through standpipe 81. Such standpipe is therefore provided with heat removal means 82, e. g. the column may be surrounded by a jacket for generation of high pressure steam. The catalyst in standpipe 81 is maintained in fluent condition by aeration gas introduced through line 83 and it may be discharged from the base of the standpipe through valve 84 into line 65 for return to reactor 14. The reduced catalyst may alternatively be recycled via line 85 to the top of the oxidizer and thus be alternatively oxidized and reduced a plurality of times before being returned to the reactor. Alternatively a part of the catalyst may be continuously returned to the oxidizer while another part is returned to the reactor.

While my invention has been described in connection with the synthesis of hydrocarbons from hydrogen and carbon monoxide it should be understood that the invention is also applicable to the desulfurization of hydrocarbon gases, synthesis gases or other gas streams generally. Thus reactor 14 may simply be a desulfurizing chamber into which sulfur containing gases are introduced through line 13 and from which desulfurized gases are removed, the size, the equipment and particular operating conditions depending upon the nature and amount of the gas stream to be desulfurized.

For simple desulfurization the apparatus of Figure 2 may be employed. The gas to be desulfurized may be introduced through line 80, the desulfurized gas withdrawn through line 79, an oxidizing gas introduced through line 66 for conveying relatively spent catalyst through line 85 and 67 to the top of tower 78, an oxygen-containing gas introduced through line 71 and a portion of the desulfurized gas from line 79 employed for introducing catalyst in the base of standpipe 74 back to the top of tower 78. In this case the catalyst may be an iron catalyst of the type hereinabove described but it is preferably an iron catalyst promoted by an alkali metal oxide, hydroxide or carbonate, or by copper, nickel, or other known promoting agent. The temperature for the desulfurization will depend upon the specific catalyst and the nature of the sulfur compound to be removed, relatively low temperatures being satisfactory for easily removable sulfur while temperatures of the order of 400 to 600° F. may be necessary for complete removal of certain organic sulfur compounds. In this case any necessary reduction of the catalyst may be effected simultaneously with the desulfurizing step per se and the sulfur compounds may be burned from the catalyst in the oxidizing tower at temperatures of the order of 750° to 1000° F., a cooler being employed in standpipe 74 if the combustion produces higher temperatures than are desirable in the sulfur removal step. No invention is claimed in the use of any specific catalyst per se since such catalysts and operating conditions therefor are known to the art. The important feature of this aspect of my invention is the multi-stage countercurrent desulfurization by means of fluidized solids.

While specific embodiments of my invention have been described in considerable detail it should be understood that these examples are by way of illustration and that the invention is not limited thereto since alternative modifications and operating conditions will be apparent from the above description to those skilled in the art. For example, the oxidation and reduction may be effected in the synthesis zone itself by interrupting synthesis gas flow and providing suitable heat exchange facilities. The oxidation may be effected by the use of steam at high temperatures, thus producing hydrogen for use in the process or elsewhere. The reduction may be effected with methane or with hydrogen produced by steam oxidation. The system of Figure 2 can be modified for use in exothermic or endothermic gas preparation steps for the synthesis. These and other possibilities and alternatives are contemplated as coming within the scope of the invention.

I claim:

1. In a process for synthesizing hydrocarbons from carbon monoxide and hydrogen the improved method of operation which comprises contacting a carbon monoxide-hydrogen mixture in a synthesis zone under synthesis conditions with an iron-type catalyst maintained in a dense turbulent suspended phase, withdrawing a portion of the iron catalyst directly from said dense phase and introducing said withdrawn catalyst to an oxidizing zone, passing an oxidizing gas upwardly in said oxidizing zone at such velocity as to maintain catalyst therein in dense turbulent suspended phase at a temperature of at least about 700° F. whereby oxidation is effected, removing catalyst from the dense phase in the oxidizing zone and introducing it into a reducing zone, passing a reducing gas upwardly through said reducing zone at such velocity as to maintain the catalyst in a dense turbulent suspended phase and at a temperature effective for reducing said catalyst and returning reduced catalyst from the dense phase in the reducing zone back to said synthesis zone.

2. The method of synthesizing hydrocarbons from carbon monoxide and hydrogen which comprises contacting a gas consisting essentially of carbon monoxide and hydrogen in a synthesis zone under synthesis conditions with a fluidized powdered iron catalyst maintained as a dense turbulent suspended phase, withdrawing a portion of the fluidized iron catalyst from the synthesis zone to an oxidizing zone, oxidizing the withdrawn portion of said catalyst in said oxidizing zone while maintaining said catalyst in fluidized condition and at a temperature within the approximate range of 1000 to 2000° F., withdrawing oxidizing catalyst from the oxidizing zone to a reducing zone, reducing said catalyst while maintaining said catalyst in fluidized dense phase condition at a temperature within the approximate range of 1000 to 2000° F., withdrawing catalyst from said reducing zone to a cooling zone, cooling said catalyst in said last-named zone to a temperature which is not substantially higher than the temperture in the synthesis zone and returning said cooled catalyst to said synthesis zone.

3. The method of synthesizing hydrocarbons from hydrogen and carbon monoxide which comprises contacting a hydrogen-carbon monoxide mixture in a synthesis zone under synthesis conditions with a fluidized powdered iron catalyst maintained as a dense turbulent suspended phase, continuously withdrawing a portion of said catalyst from the synthesis zone to an oxidizing zone, passing the iron catalyst through said oxidizing zone countercurrent to an oxidizing medium in said oxidizing zone, withdrawing catalyst from said oxidizing zone to a reducing zone, passing said catalyst through said reducing zone countercurrent to a reducing medium, withdrawing catalyst from the reducing zone to a cooling zone, cooling the catalyst to a temperature not substantially higher than the temperature in the synthesis zone and returning said cooled catalyst to said synthesis zone.

4. In a process for producing synthesis products from carbon monoxide and hydrogen by means of an iron catalyst material of small particle size wherein the effectiveness of the iron catalyst tends to become reduced by contaminating accumulations thereon, the method of removing such accumulations which method comprises suspending contaminated catalyst from the base of a fluidized catalyst column in a gaseous stream, conveying said catalyst by said stream to an oxidizing zone of relatively large cross-sectional area, passing an oxidizing gas upwardly in said oxidizing zone at such velocity as to maintain the catalyst therein in fluidized dense phase condition, maintaining a temperature in said oxidizing zone within the approximate range of 1000 to 2000° F., withdrawing fluidized catalyst from said oxidizing zone as a downwardly moving fluidized column, suspending catalyst from said column in a second gaseous stream and conveying said catalyst by said gaseous stream to a reducing zone, passing a gas upwardly through said reducing zone at such velocity as to maintain the catalyst in fluidized dense phase therein, maintaining a temperature in said reducing zone within the approximate range of 1000 to 2000° F., withdrawing fluidized catalyst from the reducing zone as a downwardly moving aerated catalyst column and returning at least a part of said catalyst from the base of said column to said oxidizing zone.

5. A process employing a powdered iron catalyst in a contacting zone wherein carbon monoxide and hydrogen are contacted with said iron catalyst under conditions for producing synthesis products and wherein the activity of the catalyst tends to decrease with continuous use, the method of maintaining said catalyst at high activity level which comprises continuously withdrawing catalyst from said contacting zone as a fluidized catalyst column, introducing catalyst from said column to an oxidizing zone, passing an oxidizing gas upwardly in said oxidizing zone at such velocity as to maintain the catalyst in fluidized dense phase condition, maintaining the temperature of said oxidizing zone within the approximate range of 1000 to 2000° F., removing catalyst as a fluidized column from said oxidizing zone and introducing it into a reducing zone, passing a reducing gas upwardly in said reducing zone at a velocity to maintain catalyst in fluidized dense phase condition and returning catalyst from said reducing zone to said contacting zone.

6. The method of claim 5 wherein the catalyst is introduced into the oxidizing and reducing zones respectively at an upper level and wherein countercurrent contact is obtained between said catalyst and the oxidizing and reducing gas respectively.

7. In a process for producing synthesis products from hydrogen and carbon monoxide by means of an iron catalyst supported on a carrier of small particle size which carrier likewise serves as a heat retention material in which process the effectiveness of the iron catalyst tends to become reduced by combustible accumulations thereon in a contacting zone, the method of operation which comprises introducing catalyst containing such accumulation from the contacting zone to the upper part of an oxidizing zone, passing said catalyst downwardly from stage to stage through said oxidizing zone while maintaining said catalyst in fluidized dense phase condition, distributing the upflowing oxidizing gas in each stage and passing said gas upwardly through fluidized dense phase catalyst in each stage whereby the oxidizing gas is effectively utilized and there is a temperature difference from stage to stage due to absorption of heat in the catalyst and carrier and transfer of heat between gases and solids, withdrawing hot catalyst from the lower part of said oxidizing zone and introducing it to the upper part of a reducing zone, introducing a reducing gas at a low level in the reducing zone, passing catalyst downwardly from stage to stage in the reducing zone in fluidized dense phase condition, distributing the upflowing reducing gas and passing reducing gas through fluidized dense phase catalyst in each stage, and returning reduced catalyst from the lower part of said reducing zone to said contacting zone.

8. A process for converting carbon monoxide and hydrogen to normally liquid hydrocarbons which process comprises passing a carbon monoxide-hydrogen mixture upwardly through a fluidized dense phase of finely divided iron catalyst particles under synthesis conditions, periodically oxidizing said catalyst by passing an oxidizing gas upwardly therethrough at such vertical velocity as to maintain the catalyst in fluidized dense phase condition, maintaining a catalyst temperature within the approximate range of 1000 to 2000° F. during the oxidation step, subsequently passing a reducing gas upwardly through said oxidized catalyst at such vertical velocity as to maintain the catalyst in fluidized dense phase condition and at a temperature for effecting reduction of the catalyst substantially to metallic state, and cooling said catalyst after said reducing step before again contacting said catalyst with carbon monoxide and hydrogen in the synthesis step.

9. In the method of synthesizing hydrocarbons from hydrogen and carbon monoxide, the steps which comprise contacting a sulfur-containing stream of a hydrogen-carbon monoxide mixture with a fluidized powdered iron synthesis catalyst while maintaining said catalyst in a first dense turbulent suspended phase, depositing sulfur removed from said gases on said catalyst, continuously withdrawing a portion of sulfur-containing catalyst from said first dense turbulent suspended phase, contacting the withdrawn catalyst with an oxidizing gas in a second dense turbulent suspended phase whereby sulfur is removed from the catalyst, transferring the desulfurized catalyst to a third dense turbulent suspended catalyst phase, contacting said catalyst with a reducing gas, and employing the said reduced catalyst in a hydrocarbon synthesis step.

10. In the method of synthesizing hydrocarbons from hydrogen and carbon monoxide, the steps which comprise contacting a sulfur-containing stream of a hydrogen-carbon monoxide mixture with a fluidized powdered iron synthesis catalyst while maintaining said catalyst in a first dense turbulent suspended phase, depositing sulfur removed from said gases on said catalyst, continuously withdrawing a portion of sulfur-containing catalyst from said first dense turbulent suspended phase, contacting the withdrawn catalyst with an oxidizing gas in a second dense turbulent suspended phase whereby sulfur is removed from the catalyst, transferring the desulfurized catalyst to a third dense turbulent suspended catalyst phase, contacting said catalyst with a hydrogen-containing gas, and contacting the so reduced catalyst with a mixture comprising hydrogen and carbon monoxide under synthesis conditions.

11. In a process for effecting a carbon monoxide-hydrogen synthesis reaction the improved method of operation which comprises contacting a carbon monoxide-hydrogen mixture under synthesis conditions with an iron catalyst of small particle size by passing said mixture upwardly in contact with a mass of said catalyst at such velocity as to maintain a dense turbulent suspended catalyst phase superimposed by a light dispersed phase, withdrawing synthesis products from the light dispersed phase, withdrawing a portion of the iron catalyst as a downwardly moving column directly from the dense phase and introducing said downwardly withdrawn catalyst to an oxidizing zone, passing an oxidizing gas upwardly in said oxidizing zone at such velocity as to maintain catalyst therein in suspended dense turbulent phase under conditions for effecting oxidation, removing a gaseous stream from the upper part of said oxidizing zone, separately removing catalyst from the dense phase in the oxidizing zone as a downwardly moving column, reducing the catalyst removed from the oxidizing zone and employing said reduced catalyst for effecting further synthesis in said contacting step.

12. In a process for effecting a carbon monoxide-hydrogen synthesis reaction with an iron catalyst of small particle size wherein the effectiveness of the catalyst is decreased by the accumulation thereon of oxidizable material, the method of operation which comprises introducing catalyst containing such oxidizable material into an oxidizing zone, passing an oxidizing gas upwardly in said oxidizing zone at such velocity as to maintain said catalyst therein in suspended dense phase turbulent condition at a temperature sufficiently high to effect oxidation of the oxidizable material, removing catalyst from the dense phase in the oxidizing zone and introducing it into a reducing zone, passing a reducing gas upwardly through the reducing zone at such velocity as to maintain the catalyst in suspended dense phase turbulent condition and at a temperature effective for reducing the catalyst to active condition and effecting hydrocarbon synthesis with said reduced catalyst.

13. In a process for producing synthesis products from carbon monoxide and hydrogen by means of an iron catalyst material of small particle size wherein the effectiveness of the catalyst material tends to gradually decrease on account of oxidizable contaminating accumulations thereon, the method of operation which comprises contacting carbon monoxide and hydrogen with said catalyst in a synthesis zone under synthesis conditions with such an iron catalyst maintained in suspended dense phase turbulent condition, withdrawing a portion of the iron catalyst directly from the dense phase in the synthesis zone and introducing said withdrawn catalyst to an oxidizing zone, passing an oxidizing gas upwardly in the oxidizing zone at such velocity as to maintain the catalyst therein in suspended dense phase turbulent condition at a temperature sufficient to effect oxidation of said oxidizable contaminating accumulations, removing catalyst from the dense phase in the oxidizing zone, reducing the removed catalyst by passing a reducing gas upwardly therethrough at low velocity and at a temperature in the range of about 700° to 2000° F. to increase its effectiveness in the synthesis zone and effecting removal of catalyst from and return of catalyst to the synthesis zone at such a rate as to maintain a substantially constant catalyst activity in said synthesis zone.

14. In a process for effecting a carbon monoxide-hydrogen synthesis reaction, the improved method of operation which comprises contacting a carbon monoxide-hydrogen mixture under synthesis conditions with an iron catalyst of small particle size by passing said mixture upwardly in contact with a mass of said catalyst at such velocity as to maintain a dense turbulent suspended catalyst phase superimposed by a light dispersed phase, withdrawing synthesis products from said light dispersed phase, separately withdrawing a portion of the iron catalyst directly from the dense phase and introducing said separately withdrawn catalyst to a second contacting zone, passing an oxidizing gas upwardly in said second contacting zone at such velocity as to maintain catalyst therein in suspended dense turbulent phase under conditions for effecting catalyst oxidation, then passing a reducing gas upwardly through oxidized catalyst material at low velocity and at a reducing temperature for a time sufficient to convert oxidized catalyst to active catalyst, introducing said active catalyst to the first-named contacting step for replacing catalyst withdrawn therefrom, and effecting withdrawal of catalyst from and introduction of active catalyst to said first-named contacting step at such a rate as to maintain a substantially constant catalyst activity therein.

15. The method of claim 14 wherein the reducing temperature is within the range of about 1000° to 1300° F. during at least a part of the time that oxidized catalyst is being converted to active catalyst.

EVERETT A. JOHNSON.

REFERENCES CITED

The following references are of record in the file of this patent:

UNITED STATES PATENTS

| Number | Name | Date |
|---|---|---|
| 1,828,734 | Dormon | Oct. 27, 1931 |
| 2,198,560 | Marshall | Apr. 23, 1940 |
| 2,325,136 | Kassel | July 27, 1943 |
| 2,331,433 | Simpson | Oct. 12, 1943 |
| 2,348,418 | Roesch | May 9, 1944 |
| 2,353,495 | Payne | July 11, 1944 |
| 2,360,787 | Murphree | Oct. 17, 1944 |
| 2,365,094 | Michael et al. | Dec. 12, 1944 |
| 2,376,191 | Roetheli | May 15, 1945 |

FOREIGN PATENTS

| Number | Country | Date |
|---|---|---|
| 27,233 | Great Britain | 1913 |
| 509,325 | Great Britain | July 14, 1939 |
| 557,904 | Great Britain | Dec. 10, 1943 |